United States Patent [19]
McGuire et al.

[11] Patent Number: 5,510,075
[45] Date of Patent: Apr. 23, 1996

[54] MOLD PROCESS FOR SYNDIOTACTIC POLYPROPYLENE

[75] Inventors: Shel McGuire, Omaha, Nebr.; Joel L. Williams, Cary, N.C.

[73] Assignee: Becton, Dickinson and Company, Franklin Lakes, N.Y.

[21] Appl. No.: 145,560

[22] Filed: Nov. 4, 1993

[51] Int. Cl.$^6$ .................................................. B29C 45/73
[52] U.S. Cl. .................. 264/328.16; 264/328.18; 264/331.17
[58] Field of Search ............... 264/328.16, 331.17, 264/328.18; 525/193, 240, 72, 194

[56] References Cited

U.S. PATENT DOCUMENTS

| | | | |
|---|---|---|---|
| 4,593,062 | 6/1986 | Puydak et al. | 525/194 |
| 4,892,851 | 1/1990 | Ewen et al. | |
| 5,124,404 | 6/1992 | Atwell et al. | 525/72 |
| 5,149,484 | 9/1992 | Ealer | 264/331.17 |
| 5,200,131 | 4/1993 | Asanuma et al. | 264/331.17 |
| 5,232,992 | 8/1993 | Asanuma et al. | 525/240 |

FOREIGN PATENT DOCUMENTS

| | | | |
|---|---|---|---|
| 225610 | 4/1958 | Australia | 264/328.16 |
| 632126 | 12/1961 | Canada | 264/331.17 |
| 68714 | 1/1983 | European Pat. Off. | 264/328.16 |
| 0428972A2 | 11/1990 | European Pat. Off. | |

*Primary Examiner*—Mathieu D. Vargot
*Attorney, Agent, or Firm*—Richard E. Brown

[57] ABSTRACT

A molding process for syndiotactic polypropylene includes holding the melt at a process temperature of about 27° to 77° C. to achieve a cycle time of less than 150° C. and a haze value for a 2 mm thick article of less than 38%.

5 Claims, 3 Drawing Sheets

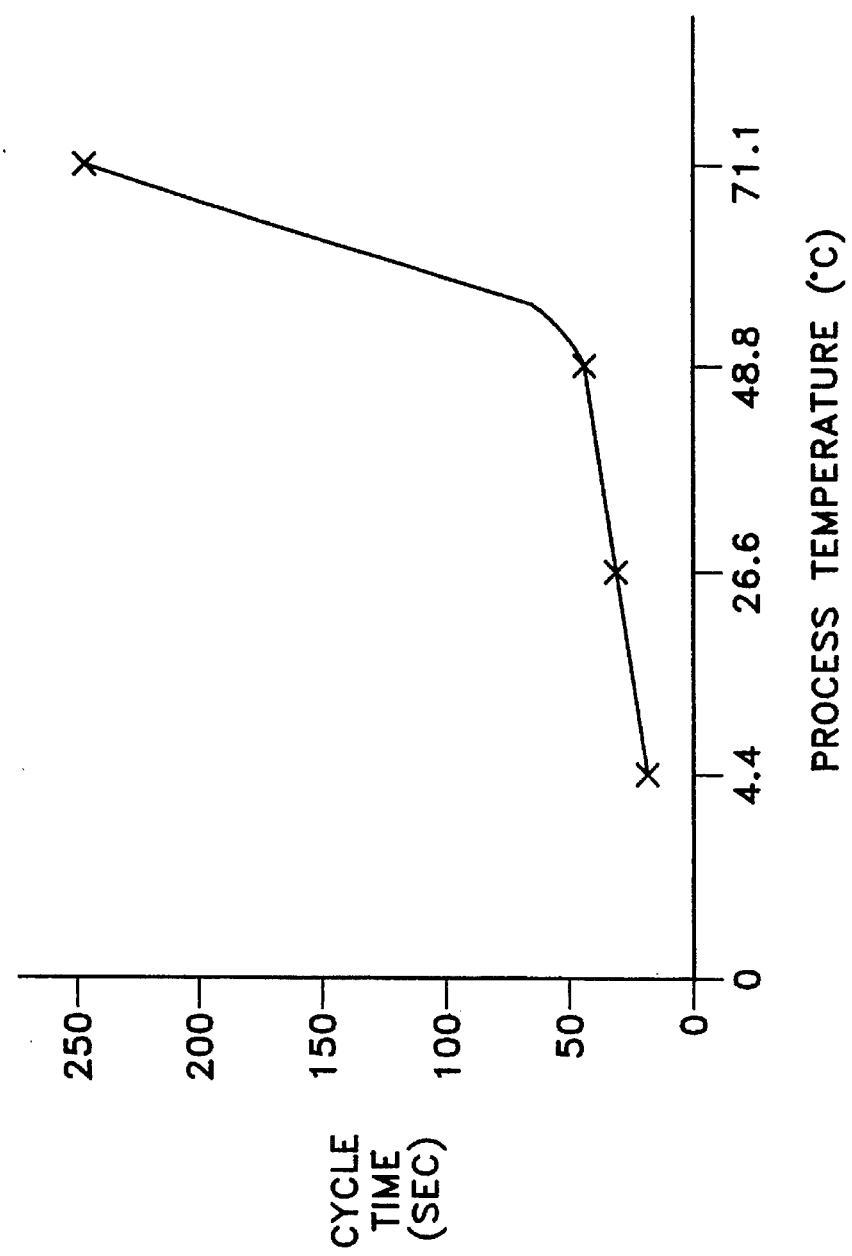

MOLD PROCESS FOR SYNDIOTACTIC POLYPROPYLENE

BACKGROUND OF THE INVENTION

1. Field of the Invention

This invention relates to molding of plastic, and more particularly relates to syndiotactic polypropylene and a process for its molding.

2. Background of the Invention

Molding is a process in which melted or plasticized polymeric material is forced into a mold where it is held until removed in a solid state having a shape which duplicates the cavity of the mold. The process consists of three basic operations: (1) raising the temperature of the plastic to a point where it will flow under pressure into the mold cavity, (2) allowing the plastic to solidify in the mold (conventionally referred to as hold time) while maintaining pressure during removal of heat, and (3) opening the mold to eject the plastic permanently frozen in the shape of the mold. The productivity of the molding operation depends on the speed of melting the plastic, the speed of injection and ejection, and the hold time required to cool and solidify the product in the mold. Thus, in the molding art, cycle time is defined as the time required for one complete operation of a molding press from closing time to closing time. In most molding operations, the largest part of the cycle time is the hold time, which generally accounts for up to 80% of the cycle time, and may be as high as 95%.

Polypropylene (PP) has long been used in molding and extruding operations for articles such as containers and films for the food packaging industry, and is known to exist in three forms. In isotactic polypropylene (IPP), the methyl groups are attached to the tertiary carbon atoms of successive monomeric units on the same side of a hypothetical plane through the polymer chain. Syndiotactic polypropylene (SPP) has the methyl groups attached on lo alternating sides of the polymer chain. Atactic polypropylene (APP) has the methyl groups attached randomly with respect to the polymer chain. APP is essentially a waxy product of low melting point whereas SPP and IPP are crystalline and of higher melting point.

All conventional molding and extruding grades of PP are substantially isotactic and are synthesized using Ziegler-Natta polymerization catalysts. Depending on the particular polymerization catalyst and conditions, these products may contain limited amounts of monomeric units having other configurations.

SPP, although known for many years in various degrees of syndiotactic purity, has been only a laboratory curiosity until recently. A new crystalline SPP of exceptionally high syndiotactic purity prepared by a process using syndiospecific metallocene catalysts is disclosed by Ewen et al. in U.S. Pat. No. 4,892,851, incorporated herein by reference. The product is stated to have a higher melting point and lower heat of crystallization that IPP. European Patent Application 428,972 discloses a method to improve the transparency of a sheet prepared with the Ewen et al. SPP.

In copending application Ser. No. 08/054,476 filed on Apr. 30, 1993, a syndiotactic polypropylene composition of greatly reduced cycle time is disclosed.

SUMMARY OF THE INVENTION

A molding process of exceptionally high productivity results from an unexpected acceleration of the rate of crystallization of a melt of pure SPP when the melt is maintained in the mold at a process temperature of about 27°–77° C. In this disclosure, the process temperature is the temperature of the melt in the mold. When molding is performed within this processing temperature range, the cycle time is reduced by up to 5 fold over the cycle time which results from molding pure SPP at either lower or higher process temperatures.

The article molded by the process of the invention has excellent tensile strength, modulus and impact resistance, is of exceptional clarity, and may be clear enough to use without adding a separate clarifying agent or including a post-molding processing operation.

BRIEF DESCRIPTION OF THE DRAWINGS

FIG. 3 is a plot of cycle time against molding process temperature for a commercial IPP composition.

DETAILED DESCRIPTION

Figure 1:
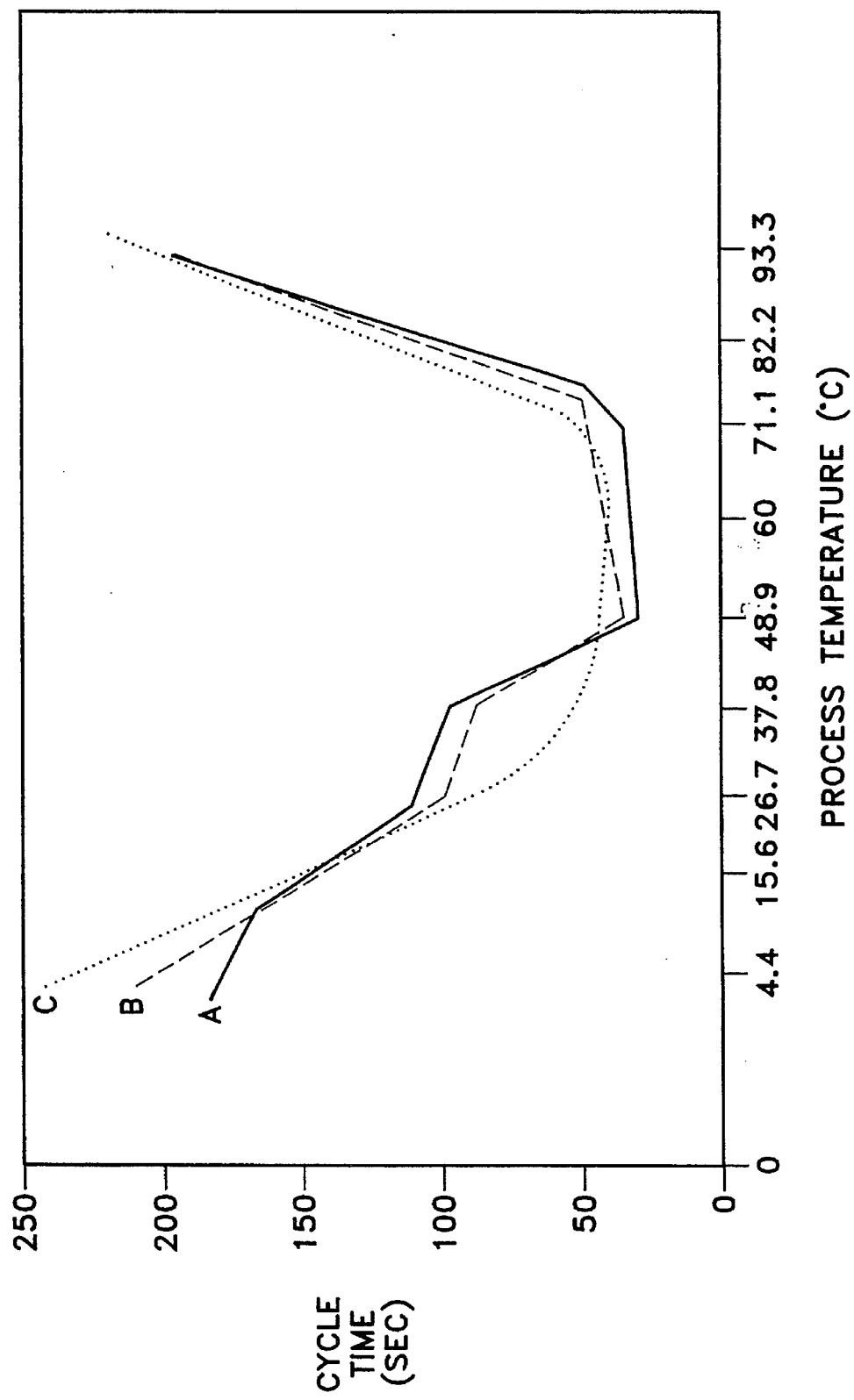
FIGS. 1 and 2 are plots of cycle time and haze respectively against molding process temperature for SPP.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. The scope of the invention will be measured by the appended claims and their equivalents.

The present invention contemplates a process for molding SPP into articles of any size or shape. Preferred articles are medical articles requiring a see-through capacity. The most preferred articles have a wall thickness of about 2 mm or less, such as blood collection tubes, centrifuge tubes, culture bottles, syringe stoppers and barrels and the like.

In the molding art, it is conventional to inject an IPP 20 composition into a cold mold and to quench the melt after injection in order to accelerate the solidification process. It has been found that a melt of pure SPP, when injected into a cold mold, crystallizes very slowly, requiring a long hold time in the mold before ejection. Thus, a cycle time of at least 165 sec is required to mold a plaque about 2 mm thick from the SPP of the aforementioned U.S. Pat. No. 4,892,851 at a process temperature of 40° F. (4.4° C.). Conventional nucleators, such as sorbitols, do not shorten this mold cycle time. Further, molding of the SPP under these conventional conditions is difficult and molded plaques, while of satisfactory clarity, are non-uniform and have wavy surfaces. After cooling and crystallization, the plaques stick to the mold making ejection difficult.

In accordance with the process of the invention, SPP may be molded within a particular temperature range. Preferably, the SPP is heated above its melting point and the melt injected into the mold through a nozzle at any combination of nozzle temperature and pressure sufficient to induce flow of the melt. Preferably, the melt may be at a nozzle temperature of 200° C. or higher, most preferably about 220°–250° C. A melt flow rate of about 1–50, preferably about 3–30g/min, may be employed for injection.

Prior to injecting the polymer melt into the mold, the mold may preferably be adjusted to a mold temperature sufficient to achieve the desired process temperature. The temperature of the mold, as determined by the temperature of the circulating fluid in the molding apparatus, may advantageously be a little higher than the process temperature to account for convection losses. The melt is then held at the process temperature until crystallization takes place. The mold may then be opened and the article removed. One skilled in the art will readily appreciate various combinations of nozzle temperature, mold temperature, pressure and flow rate under which the desired process temperature may be achieved.

It has been found that a process temperature between about 27° and 77° C. results in a cycle time of less than 150 sec. and a haze of less that 38%. A preferred process temperature is between 49° and 77° C. wherein a cycle time of 50 sec and a haze of about 31% is achieved. The most preferred process temperature is between 49° and 70° C. to give a cycle time of less that 39 sec and a haze of less than 26%.

The SPP to be molded may additionally include effective quantities of any conventional additive as known in the polyolefin art such as, for example radiation stabilizers, fillers, coloring agents, antistatic materials, wetting agents, nucleators and the like, providing the desired physical properties, clarity, and moldability are not adversely affected. Determination of suitable quantities of these additives to be included in an SPP composition is well within the purview of one of ordinary skill in the polymer and molding arts.

Testing of the samples of the invention for physical properties, clarity and mold cycle times was performed on molded 1 and 2 mm step plaques. Clarity may be given as the conventional percent haze value and may be determined by ASTM procedure D-1003. Cycle time may be determined on 2 mm step plaques as described in Example 2.

The following examples are given to further describe the invention but are not to be considered as limitative of the invention.

Experimental

A. SPP Molding material: SPP of melting point 125° C.; 0.08% by weight TINUVIN® 622 hindered amine stabilizer (Ciba-Geigy); 0.08% sodium stearate.

B. Molding Apparatus—Arburg ALLROUNDER® 170-90-200 injection molding machine combined with an ADVANTAGE® chiller (Advantage Engineering, Inc., Greenwood, Ind.).

EXAMPLE 1

General Procedure for Molding

A 1 mm and 2 mm step plaque mold was equilibrated with the ADVANTAGE® chiller to a mold temperature sufficient to give the melt process temperatures given in the Tables below. The SPP molding material was melted and injected through a nozzle into the mold at a nozzle temperature of about 219°–249° C. and a flow rate of 5.0 g/min. The polymer melt was held in the mold at the process temperature until crystallization of the melt took place. The molded step plaque was ejected and cycle time and haze determined.

EXAMPLE 2

Determination of Cycle Time

Cycle time was measured as the time interval between injection and ejection. Ejection was recorded as the time when the crystallized article could be removed easily from the mold cavity without sticking.

EXAMPLES 3–20 of the Invention

By the general procedure of Example 1, the following plaques of Table I were molded and their cycle times and haze values determined.

TABLE I

| | Temperature °C. | | Cycle Time | Haze % | |
|---|---|---|---|---|---|
| | Nozzle | Process | sec. | 1 mm | 2 mm |
| 3 | 219 | 26.7 | 106.6 | 5.6 | 14.4 |
| 4 | 237 | 26.7 | 99.6 | 5.8 | 16.8 |
| 5 | 247 | 26.7 | 96.1 | 5.3 | 16.8 |
| 6 | 220 | 37.8 | 98.7 | 6.5 | 14.4 |
| 7 | 237 | 37.8 | 87.3 | 6.6 | 17.0 |
| 8 | 249 | 37.8 | 55.9 | 6.3 | 18.7 |
| 9 | 219 | 48.9 | 31.7 | 8.0 | 18.3 |
| 10 | 237 | 48.9 | 34.5 | 8.2 | 18.9 |
| 11 | 249 | 48.9 | 48.8 | 7.3 | 19.7 |
| 12 | 219 | 54 | 32.7 | 8.7 | 21.7 |
| 13 | 237 | 54 | 38.6 | 8.3 | 20.8 |
| 14 | 249 | 54 | 38.9 | 8.6 | 21.7 |
| 15 | 218 | 71.1 | 37.2 | 9.8 | 26.3 |
| 16 | 238 | 71.1 | 50.1 | 11.0 | 28.8 |
| 17 | 248 | 71.1 | 44.1 | 11.1 | 31.2 |
| 18 | 220 | 76.6 | 48.4 | 10.8 | 29.6 |
| 19 | 239 | 76.6 | 52.2 | 12.3 | 33.2 |
| 20 | 248 | 76.6 | 59.3 | 13.1 | 35.9 |

It is seen from the above examples that cycle time reaches a minimum at intermediate process temperatures before rising, and that at these preferred process temperatures, haze is only moderately higher than the lowest value observed in comparative Examples 21–29.

EXAMPLES 2.1–29 (Comparative)

TABLE II

| | Temperature °C. | | Cycle Time | Haze % | |
|---|---|---|---|---|---|
| | Nozzle | Process | (sec) | 1 mm | 2 mm |
| 21 | 219 | 4.4 | 180 | 7.6 | 11.5 |
| 22 | 238 | 4.4 | 210 | 3.8 | 11.0 |
| 23 | 248 | 4.4 | 240 | 3.7 | 10.3 |
| 24 | 219 | 15.6 | 165 | 8.5 | 13.8 |
| 25 | 237 | 15.6 | 165 | 4.2 | 12.5 |
| 26 | 247 | 15.6 | 176 | 4.2 | 13.2 |
| 27 | 220 | 93.3 | 200 | 25.0 | 61.2 |
| 28 | 239 | 93.3 | 200 | 40.6 | 73.5 |
| 29 | 248 | 93.3 | 210 | 51.0 | 77.5 |

Comparative examples 21–26 above show high cycle times but excellent haze values for SPP molded at low process temperatures. Comparative examples 27–29 show that SPP molded at high process temperatures has high cycle times and high haze values.

Figure 2:
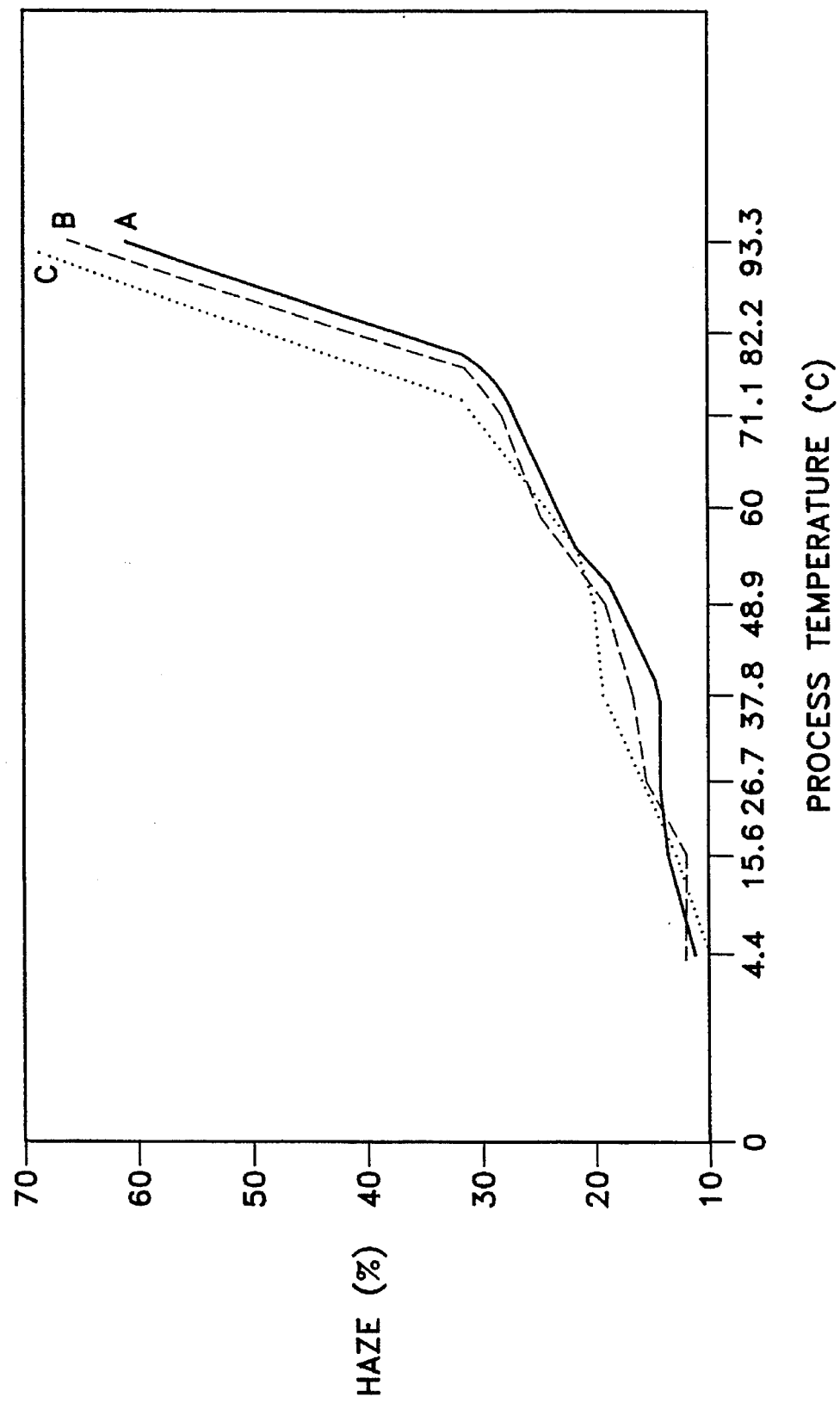

The data of inventive examples 3–20 of Table I and comparative examples 21–29 of Table II are presented graphically in FIGS. 1 and 2 wherein plots A, B and C depict the results obtained at about 219°, 238° and 249° C. nozzle temperatures respectively.

EXAMPLE 30 (Comparative)

IPP (commercial grade) containing hindered phenol antioxidant, melt flow 12, was molded by the procedure of Example 1 at the process temperatures given below and cycle times were determined.

| Process Temperature (°C.) | Cycle Time (sec) |
|---|---|
| 4.4 | 18.4 |
| 26.6 | 24.6 |
| 48.8 | 36.6 |
| 71.1 | 240 |

The data is presented graphically in FIG. 3. It is seen that IPP gives low cycle times when molded at the low process temperatures which give high cycle times with SPP, and that IPP cycle time rises sharply in the preferred process temperature range of 49°–77° C. of the invention.

What is claimed:

1. A process for molding syndiotactic polypropylene comprising:
   a) injecting a melt of syndiotactic polypropylene into a mold maintained at a temperature sufficient to keep said melt in the mold at a process temperature of 49° to 77° C.;
   b) holding said melt at said process temperature until it crystallizes into an article having the shape of said mold; and
   c) ejecting said article from said mold wherein process steps (a) and (b) are complete in a cycle time of 50 sec. or less and said article has a haze value of 31% or less.

2. The process of claim 1 wherein said melt is at a temperature of at least 200° C. when injected into said mold.

3. The process of claim 1 wherein said melt includes a polymer additive.

4. The process of claim 3 wherein said additive is selected from the group consisting of a radiation stabilizer, filler, coloring agent, anti-static material, wetting agent and nucleator.

5. A process for molding syndiotactic polypropylene comprising:
   a) injecting a melt of syndiotactic polypropylene into a mold maintained at a temperature sufficient to keep said melt in the mold at a process temperature of 49° to 70° C.;
   b) holding said melt at said process temperature until it crystallizes into an article having the shape of said mold; and
   c) ejecting said article from said mold wherein process steps (a) and (b) are complete in a cycle time of 39 sec. or less and said article has a haze value of 26% or less.

* * * * *